US008201764B2

(12) United States Patent
Pallmann

(10) Patent No.: US 8,201,764 B2
(45) Date of Patent: Jun. 19, 2012

(54) DEVICE FOR COMMINUTING FEEDSTOCK WITH SCRAPING ELEMENTS

(75) Inventor: Hartmut Pallmann, Zweibrucken (DE)

(73) Assignee: Pallmann Maschinenfabrik GmbH & Co. KG, Zweibruecken (DE)

(*) Notice: Subject to any disclaimer, the term of this patent is extended or adjusted under 35 U.S.C. 154(b) by 126 days.

(21) Appl. No.: 12/704,328

(22) Filed: Feb. 11, 2010

(65) Prior Publication Data

US 2010/0206970 A1 Aug. 19, 2010

(30) Foreign Application Priority Data

Feb. 11, 2009 (DE) ........................ 10 2009 008 448

(51) Int. Cl.
*A47J 17/18* (2006.01)

(52) U.S. Cl. ........................ 241/167; 241/236; 241/243

(58) Field of Classification Search .................. 241/166, 241/167, 236, 243
See application file for complete search history.

(56) References Cited

U.S. PATENT DOCUMENTS 4,423,844 A * 1/1984 Sours et al. .................... 241/35
5,538,193 A * 7/1996 Takahashi et al. .............. 241/33
5,562,255 A * 10/1996 Witko et al. .................. 241/158
5,680,999 A * 10/1997 Wada ............................ 241/236
5,826,809 A * 10/1998 Kroger .......................... 241/167
5,829,697 A * 11/1998 Kroger .......................... 241/236
5,921,482 A * 7/1999 Chou ............................ 241/167
6,439,486 B1 * 8/2002 Nitta et al. ..................... 241/29
6,732,963 B2 * 5/2004 Kasada et al. ................ 241/135
6,978,956 B2 * 12/2005 Maynard ....................... 241/224
7,448,568 B2 * 11/2008 Katsumura et al. ........... 241/243
7,658,343 B2 * 2/2010 Potts ............................ 241/158
7,708,219 B2 * 5/2010 Potts ............................ 241/158

FOREIGN PATENT DOCUMENTS

DE 10 2005 026 816 A1 12/2006
EP 0 760 251 A1 3/1997

* cited by examiner

*Primary Examiner* — Bena Miller
(74) *Attorney, Agent, or Firm* — Muncy, Geissler, Olds & Lowe, PLLC

(57) ABSTRACT

A device for comminuting scrappable feedstock by way of cutting or shear-cutting is provided that includes at least one rotor situated within a housing. The rotor has a plurality of rotary disks which are situated at an axial distance from each other, forming spaces, and which are fitted on their circumferences with comminuting tools which interact with additional comminuting tools to perform the comminution work. Stationary scraping elements extend into the spaces in the radial direction. To achieve a largely unhindered flow of stock through the device, it is proposed according to the invention to situate the stationary scraping elements in the dead zone of the at least one rotor with regard to the direction of stock flow.

18 Claims, 5 Drawing Sheets

DEVICE FOR COMMINUTING FEEDSTOCK WITH SCRAPING ELEMENTS

This nonprovisional application claims priority under 35 U.S.C. §119(a) to German Patent Application No. DE 10 2009 008 448, which was filed in Germany on Feb. 11, 2009, and which is herein incorporated by reference.

BACKGROUND OF THE INVENTION

1. Field of the Invention

The invention relates to a device for comminuting scrappable feedstock by way of cutting or shear-cutting.

2. Description of the Background Art

The comminution of feedstock is a central component of mechanical process engineering, in which a source material is reduced into smaller components by a separation operation. The feedstock is thereby changed in size, shape or composition with regard to its later use. An example of this would be the preparation of waste material, in which the source material must be reduced in size in order to be processed in subsequent processing stations, or in which the feedstock is simultaneously separated into different fractions thereof, following comminution.

The invention relates to the field of comminution technology, in which the comminution work is performed primarily by cutting and shear-cutting, i.e. the active edges of two tools are run past each other while maintaining a narrow gap. The feedstock must therefore be cuttable, which rules out the use of mineral materials for comminution. Suitable tools are, for example, rotary disks mounted on a rotor whose cutting edges run along the disk circumference and which interact with directly adjacent rotary disks. It has been demonstrated that portions of the feedstock become wedged in the spaces formed by the rotary disks or, in the case of fibrous or wire-shaped feedstock, are wound around the drive shaft. These portions therefore not only fail to be comminuted, but they also greatly interfere with the smooth comminution of the remaining feedstock. These portions must therefore be removed from the rotor at regular intervals, which involves painstaking and time-consuming manual labor. In addition to the labor costs associated therewith, machine down times caused thereby must also be taken into account, which negatively impacts the overall economic feasibility of devices of this type.

To remedy this situation, a device is known from EP 0 760 251 A1, the cutting tool of which comprises two counter-rotating rotors on which are mounted meshing cutting disks. Scraping elements which run along the side housing wall on a radial plane are attached in the area of the axial distance between two cutting disks, the projecting ends of these scraping elements having an edge of concave design which follows the shaft circumference. The scraping elements perform the function of removing feedstock located in the space from the rotor in the radial direction.

The disadvantage of devices of this type is caused by the machine construction. By attaching the scraping elements to the side walls of the housing, the forces acting upon the scraping elements are introduced directly into the housing. The side walls must therefore be reinforced accordingly, which is ordinarily done by means of complex ribbed wall constructions.

To introduce these forces into the housing walls as safely as possible, the scraping elements have an approximately triangular shape, the base of the triangle being used for attachment to the side wall. To nevertheless obtain an obtuse angle of connection to the drive shaft in a scraping element design of this type, in order to achieve a lifting effect for the feedstock to be removed, it is necessary for the scraping elements to relatively broadly surround the shaft. Known scraping elements are therefore designed with a correspondingly large size.

Furthermore, the side attachment of the scraping elements, together with the radial overlapping of the two rotors in the central region of the device, produces a barrier for the feedstock which runs at the height of the rotors and prevents the material from flowing freely to the side between the rotor and the housing. This is disadvantageous, particularly in reversing mode, since interfering feedstock cannot be automatically removed from the device and therefore causes an operational shutdown.

A device according to the definition of the species is known from DE 10 2005 026 816 A1, the cutting tool of which is also formed by two counter-rotating rotors which run parallel to the axis. Cutting disks which are fitted with knives at an axial distance along the circumference and perform the comminution work in interaction with counter-knives are mounted on the rotors. First counter-knives are situated along the housing wall and are permanently connected thereto; second counter-knives are mounted centrally on a cross member beneath the cutting tool in the radial overlapping area of the two rotors. Scraping elements whose free ends extend radially into the space between two cutting disks, where they interact with rotating knives on the cutting disks, are integrated into the counter-knives.

As in the prior publication cited above, a disadvantage also arises here from the attachment between the counter-knives and the housing walls. Strong forces are thereby introduced into the side housing parts, which, in turn, necessitates a stable and complex design of the housing walls.

In addition, the counter-knives and cutting tool again form a continuous barrier at the height of the rotors, which makes it impossible in reversing mode to automatically remove interfering feedstock from the device. The cross-member in the area of the material passage between the two rotors also provides an increased resistance to flow which hinders the material in flowing through the device.

SUMMARY OF THE INVENTION

It is therefore an object of the present invention to provide a device that avoids the aforementioned disadvantages.

In an embodiment, the scraping elements are situated immediately downstream from the rotor in the direction of throughflow, i.e. in the dead zone of the rotor. During normal operation of a rotor according to the invention, this prevents the scraping elements from forming flow resistance within the device, and the material therefore flows largely unhindered. In reversing mode, the scraping element arrangement according to the invention enables the feedstock responsible for the disturbance to be automatically removed from the device. This enables the a device according to the invention to be operated with less maintenance work, compared to known devices. Downtimes due to standstill are minimized, which increases the overall economic efficiency of devices according to the invention.

A further advantage is derived from mounting the scraping elements on a support beam attached to the machine base frame. By directly introducing the forces coming from the scraping elements into the machine base frame, the axially parallel housing walls are easier to construct. In addition to the associated material savings, this makes it possible to design one or both longitudinal walls as swinging doors, which provides fast, easy and excellent accessibility to the cutting tool and also enables maintenance and repair work to be performed quickly and easily. Mounting the scraping elements directly also reduces deformations under load, so that the cutting gap geometry is maintained during comminution.

In contrast to the related art, the scraping elements according to an embodiment of the invention have a plate-shaped design, including an approximately trapezoidal contour. The larger base of the trapezoid is assigned to the rotor, while the smaller opposite side is used for attachment to the support beam. This results in a geometry which provides a relatively large angle $\alpha$, which is preferably larger than 140 degrees, between the scraping element and the rotor. Using a geometry of this type, a pronounced lifting action is applied to the feedstock, so that feedstock present between the rotary disks is reliably conveyed to the outside in the radial direction. At the same time, this geometry minimizes the length of the scraping element extension in the circumferential direction of the rotor. The scraping elements may therefore have a smaller design, offering the advantage of better handling and more economical manufacture.

According to an embodiment of the invention, the scraping elements are designed in multiple parts and have a disk-shaped base member, which is provided with scraping tools only on its active edges. This embodiment enables the base member to be manufactured from a less hard material, while the scraping tools are made of a wear-resistant material. By reducing the proportion of high quality material on the scraping tools susceptible to wear, the tool life cycles may be increased without simultaneously increasing the manufacturing costs. It is also possible to replace only the scraping tools in the event of advanced wear, which further increases the economic feasibility of a device according to the invention.

Independently thereof, the scraping elements may also be manufactured monolithically, i.e. made from a single piece, a wear-resistant material being advantageously used in this case.

In a further embodiment, the scraping tools can form an axial projection over the sides of the base member, i.e. the width of the scraping tools is greater than the thickness of the base member. In addition to minimizing material consumption and weight, an embodiment of this type has the additional advantage that material present behind the scraping tools in the radial direction may be directed downward in the gap between the rotary disk and the base member.

However, embodiments in which the scraping elements have an essentially uniform thickness over their entire side areas, i.e. the base member and scraping tool have the same dimensions in the axial direction, also lie within the scope of the invention.

The use of centering means in the butt joints between the individual components of the scraping unit achieves an extremely high manufacturing accuracy, so that the scraping elements are positioned precisely between the rotary disks even in rotors having ten or more rotary disks. This ensures that the predetermined cutting clearance geometry is maintained and prevents any resulting excess wear or interference with the comminution work.

An embodiment of the invention has also proven to be advantageous, in which a clearance is maintained between the rotor and adjacent housing wall, so that feedstock may be removed from the comminution chamber in reversing mode in the free space formed by this clearance, in that the fault is easily corrected in the event of a malfunction by reversing the direction of rotor rotation. Optionally situating a partition wall beneath the rotor ensures that feedstock that is discharged from the device by the free space in reversing mode is not mixed with the stock flow that has already been sufficiently comminuted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
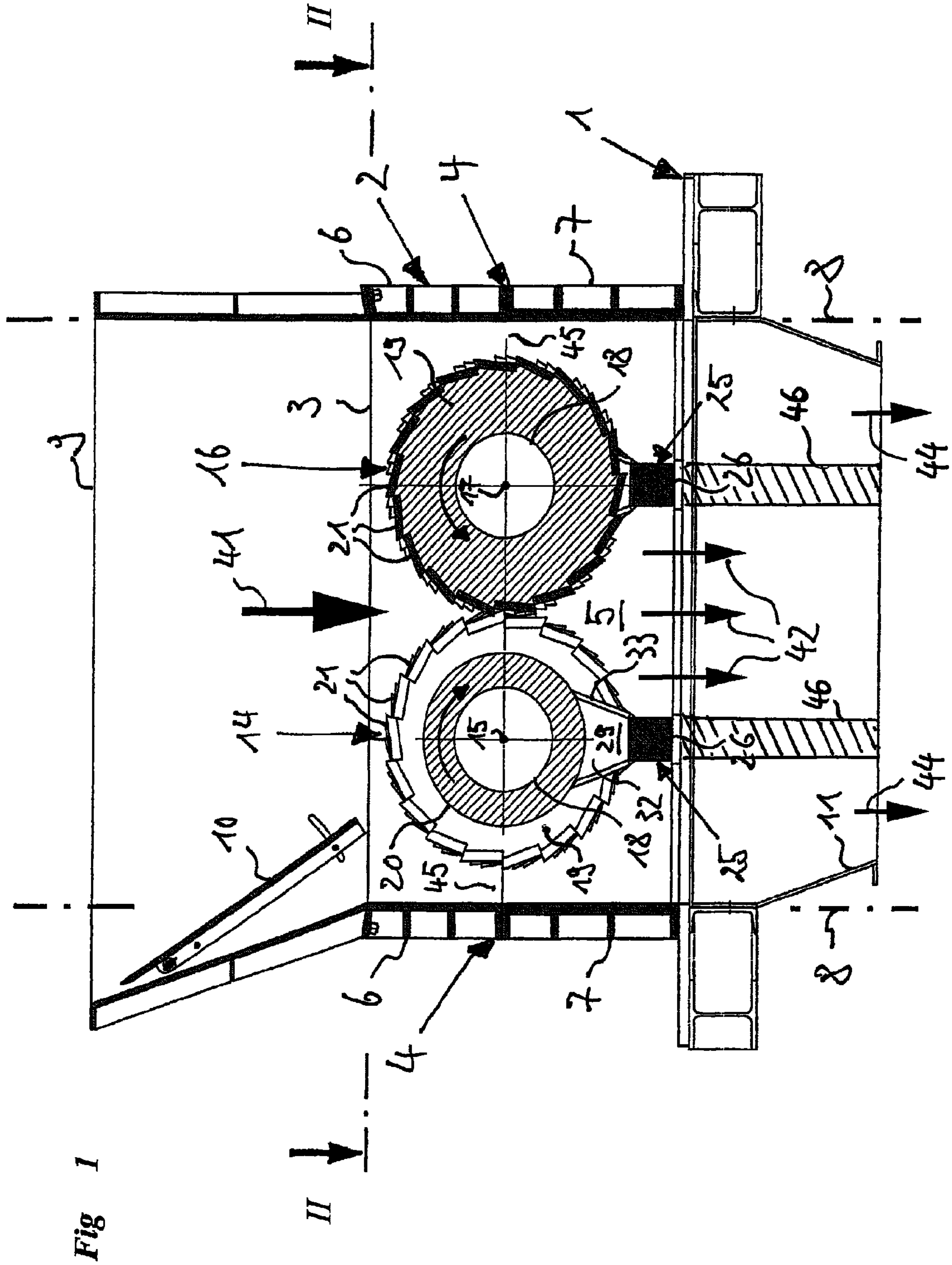
FIG. 1 shows a cross-sectional view of a device according to the invention along line I-I illustrated in FIG. 2.
Figure 2:
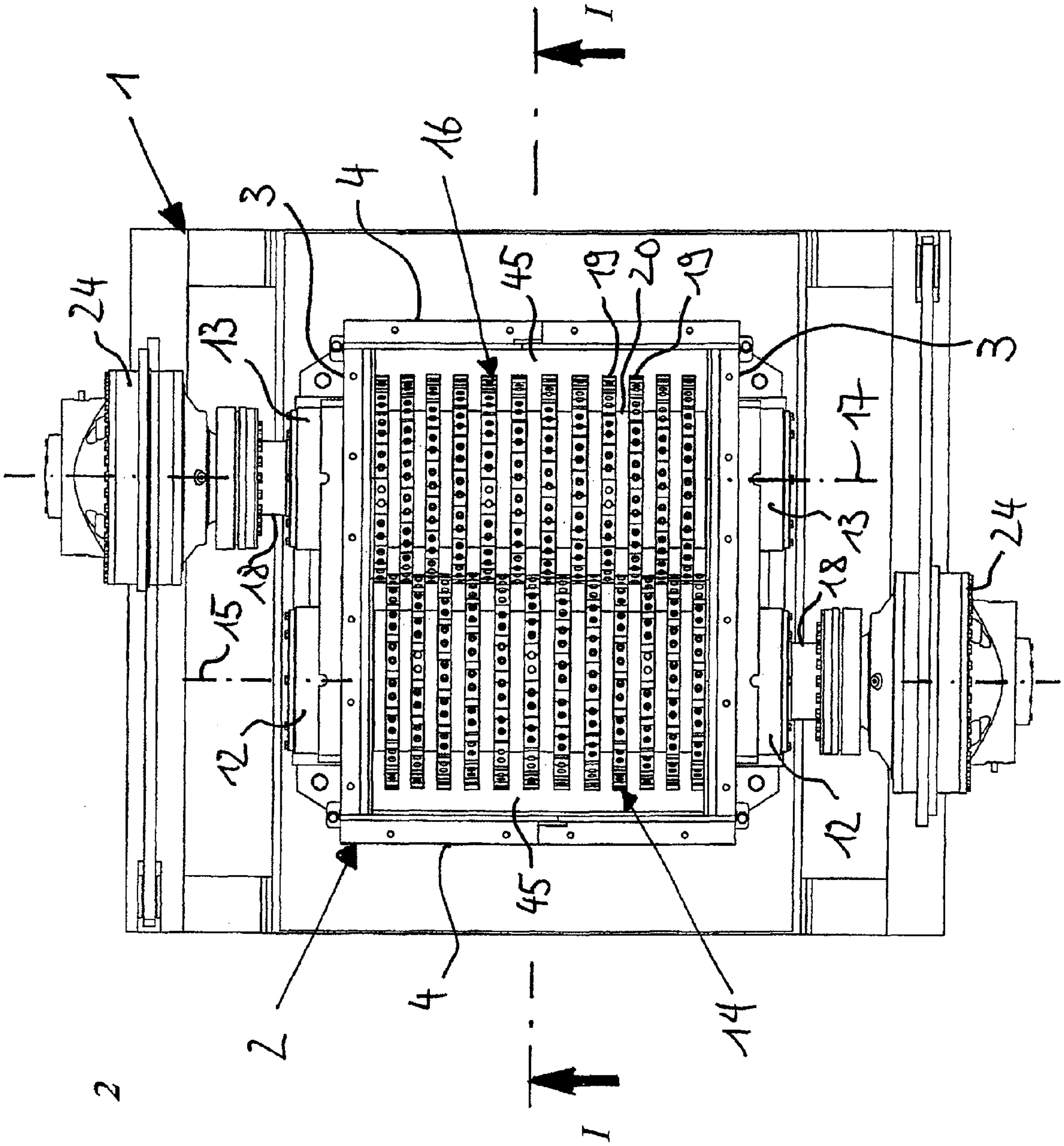
FIG. 2 shows a horizontal cross-sectional view of the device illustrated in FIG. 1 along line II-II shown therein.

FIGS. 1 and 2 provide an overview of the device according to the invention. The figures show a frame-like substructure 1, which is composed of steel profiles and on which a rectangular housing 2 rests. Housing 2 is formed by two opposite longitudinal walls 3 and transverse walls 4 connecting longitudinal walls 3 which together surround a comminution chamber 5. Lockable transverse walls 4 are each formed of two parts and have an upper wall part 6 and a lower wall part 7, which may be pivoted individually or together around a vertical pivot axis 8 in order to open housing 2.

Housing 2, which opens to the top, is adjacent to a material inlet 9, whose left inlet wall in the illustrations is inclined to facilitate loading feedstock into comminution chamber 5 and is equipped with a chute 10, whose angle of inclination is adjustable relative to the vertical. Beneath and adjacent to comminution chamber 5 is slightly hopper-shaped material outlet 11, through which the sufficiently comminuted stock leaves the device according to the invention for further processing in other stations.

Longitudinal walls 3 each have a first pivot bearing 12 and a second pivot bearing 13 situated opposite each other at approximately half the height of longitudinal walls 3, the pivot bearings being intended to rotationally accommodate a first rotor 14 along rotation axis 15 and a second rotor 16 along rotation axis 17. Rotors 14 and 16 are oriented horizontally and parallel to transverse walls 4, i.e. they run axially parallel to each other.

Figure 3:
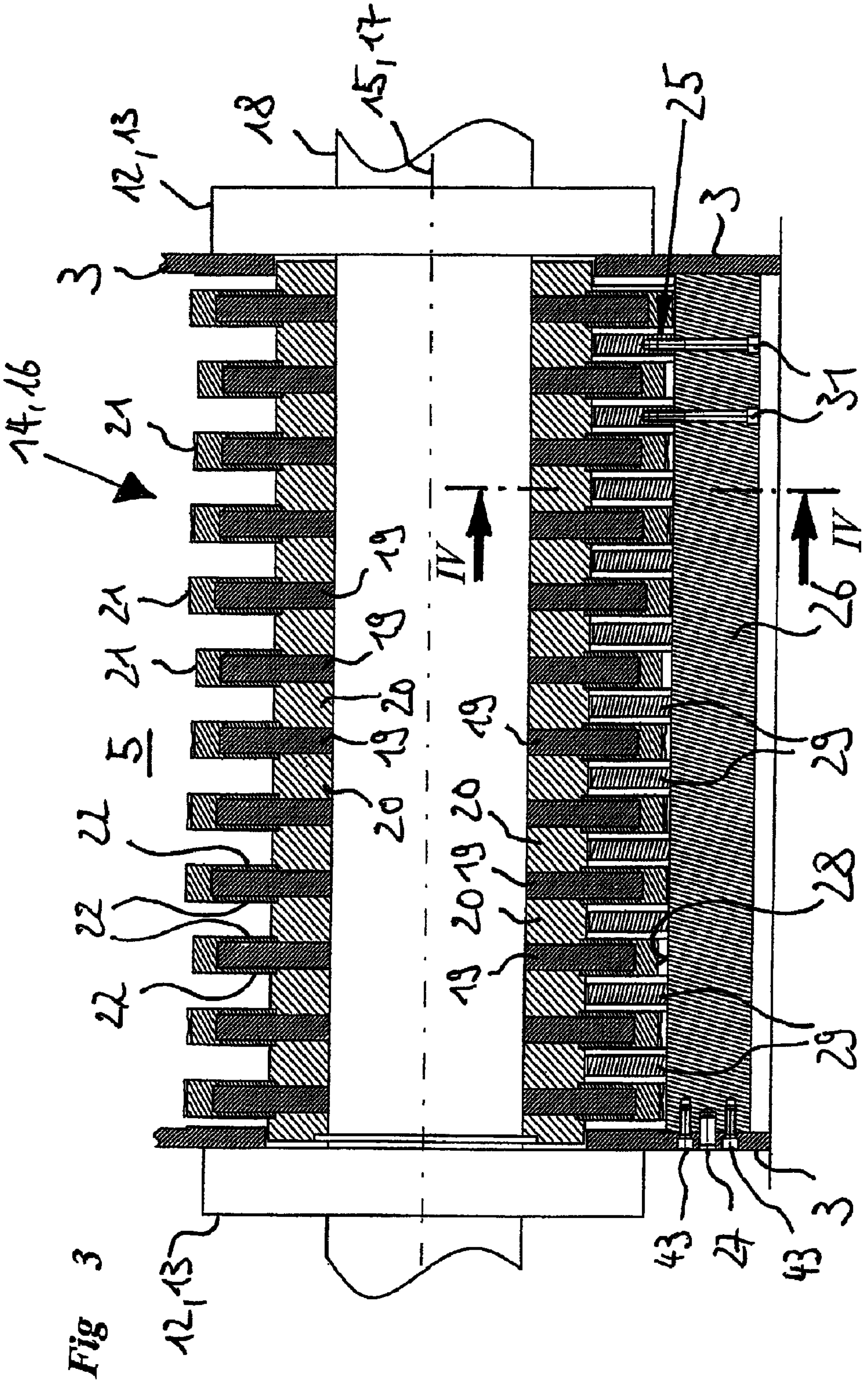
FIG. 3 shows a partial cross-sectional view in the longitudinal direction of the rotor, including the corresponding scraping unit.

The structure of rotors 14 and 16 is shown in FIGS. 1 and 2 as well as in FIG. 3, which illustrates a partial cross-sectional view along rotor axis 15, 17. Each rotor 14, 16 includes a drive shaft 18 which extends through openings in longitudinal walls 3 and up to pivot bearings 12 and 13. A plurality of circular rotary disks 19—12 units in this case—are nonrotationally mounted on the longitudinal section of the drive shaft extending within comminution chamber 5, the circumference of these rotary disks being fitted with shoe-shaped comminuting tools 21. Coaxial distance plates 20 are inserted between rotary disks 19 in order to form spaces and thus provide an axial distance between rotary disks 19. Rotary disks 19 are bordered by wear plates 22 in the annular-disk-shaped area outwardly adjacent to distance plates 20 in the radial direction (FIG. 3).

The ends of both drive shafts 18 on opposite sides of the housing form a projection which is force-coupled to a drive 24 which produces the counter-rotation of rotors 14 and 16.

The relative arrangement of rotors 14 and 16 to each other is such that rotary disks 19 of first rotor 14 and rotary disks 19 of rotor 16 mesh with each other, due to the provision of an axial offset and a radial overlapping in the circumferential area. In this manner, the axially opposite edges of comminuting tools 21 form cutting or shearing gaps where the comminution work takes place, following the counter-rotation of rotors 14 and 16. The axial width of the gap is no more than one millimeter, preferably no more than 0.5 millimeters.

To prevent feedstock from becoming wedged or stuck in the cavities between rotary disks 19, a scraping unit 25 is provided, which evacuates the feedstock present therein radially toward the outside and returns it to the comminution process in this manner. The precise structure of scraping unit 25 is illustrated, in particular, in FIGS. 1, 3 and 4, and includes a support beam 26, which extends axially parallel to axes 15 and 17, beneath each rotor 14 and 16 in each case. Support beam 26 is thus situated in the dead zone of rotors 14 and 16 in relation to the flow of material in comminution chamber 5.

Support beam 26 spans the entire width of comminution chamber 5 and is attached to longitudinal walls 3 to form a precise fit, using horizontally and/or vertically acting centering means. The centering means may be brackets, tabs engaging with grooves or, as in the present embodiment, alignment bores and alignment pins 27 interacting therewith. Screws 43 provide a secure connection (FIG. 3).

On its side facing rotor 14 and 16, respectively, support beam 26 has a bearing surface 28 for accommodating plate-shaped scraping elements 29, which extend into the spaces between rotary disks 19 in the radial direction. Plate-shaped scraping elements 29 have an approximately trapezoidal contour line (FIGS. 1 and 4), whereby the longer base of the trapezoid is of concave design. The curvature of the base is as great or greater than the circumferential curvature of distance plates 20, ensuring that the tapered evacuation edges of scraping element 29 pass closely to the outer circumference of distance plates 20 and thereby may reliably perform their evacuation function. The opposite, shorter side of trapezoidal scraping element 29 is used to rigidly attach scraping element 29 to bearing surface 29 of support beam 26 to form a precise fit. Once again, centering means, such as stop surfaces, tabs engaging with grooves or, as in the present case, alignment holes having alignment pins 30, provide a precisely fitting and thus exact connection. Scraping elements 29 and support beam 26 are held together under tension by screws 31.

This results in a comb-like design of scraping unit 25, whose precise, relative arrangement to rotor 14 and 16, respectively, enables the scraping elements 29, which are oriented in a plane-parallel direction to rotary disks 19, to extend radially into the spaces between rotary disks 19, maintaining a side gap, and to end at the lateral surface of distance plates 20, maintaining a radial gap. In the embodiment described herein, the side or axial width of the gap is no more than one millimeter, preferably no more than 0.5 millimeter, and the radial gap width is one millimeter or less at its narrowest point. Scraping elements 29 thus fill the space between rotary disks 19 in an approximately precisely fitting manner.

Figure 4:
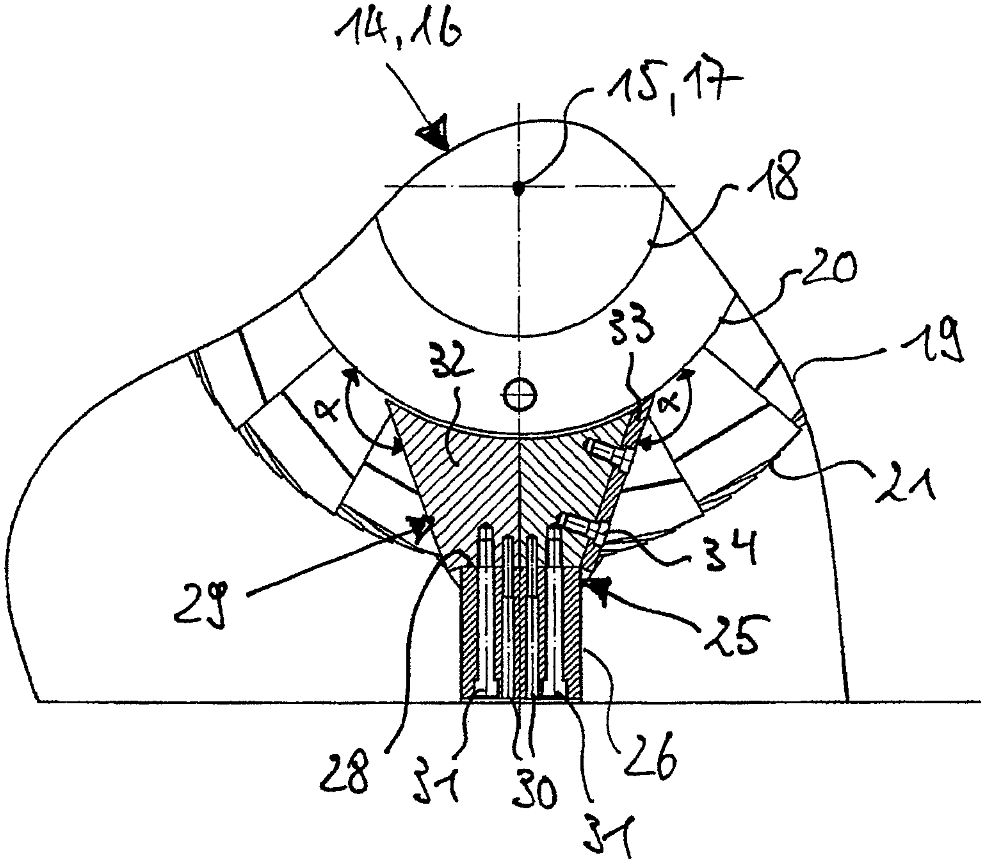
FIG. 4 shows a cross-sectional view of the area illustrated in FIG. 3 along line IV-IV shown therein.

In the present exemplary embodiment, scraping elements 29 have a multi-part design and a trapezoidal base member 32, whose inclined sides are edged with wear-resistant, strip-shaped scraping tools 33 (FIG. 4). The width of scraping tools 33 corresponds to the thickness of base member 32, so that each scraping element 29 has an all-over uniform thickness. Alignment screws 34 ensure that scraping elements 33 are mounted on base member 32 to form a precise fit.

Instead of a multi-part structure, scraping elements 29 may also be produced monolithically from a single wear-resistant material.

In an alternative embodiment of the scraping elements, which is not illustrated, the base member has a greater thickness than the scraping tools. In this manner, the scraping tools project over the base member on both sides so that the base member is located at a greater distance from the adjacent rotary disks than the scraping tools.

As is further shown in FIG. 1, a partition wall 46 is situated downstream from each scraping unit 25 in the direction of throughflow, which divides material outlet 11 into a central channel for stock flow 42 and two side channels for stock flows 44. Stock flows 44 are produced when the rotors are reversed, interfering feedstock or foreign bodies being removed from the device.

FIGS. 1 and 3 show a symmetrical structure of scraping elements 29 with regard to their vertical center plane, which ensures that scraping elements 29 may be able to optimally perform their function even in reversing mode. Regardless thereof, embodiments also lie within the scope of the invention whose scraping elements have an asymmetrical design or only one active evacuation edge.

Figure 5:
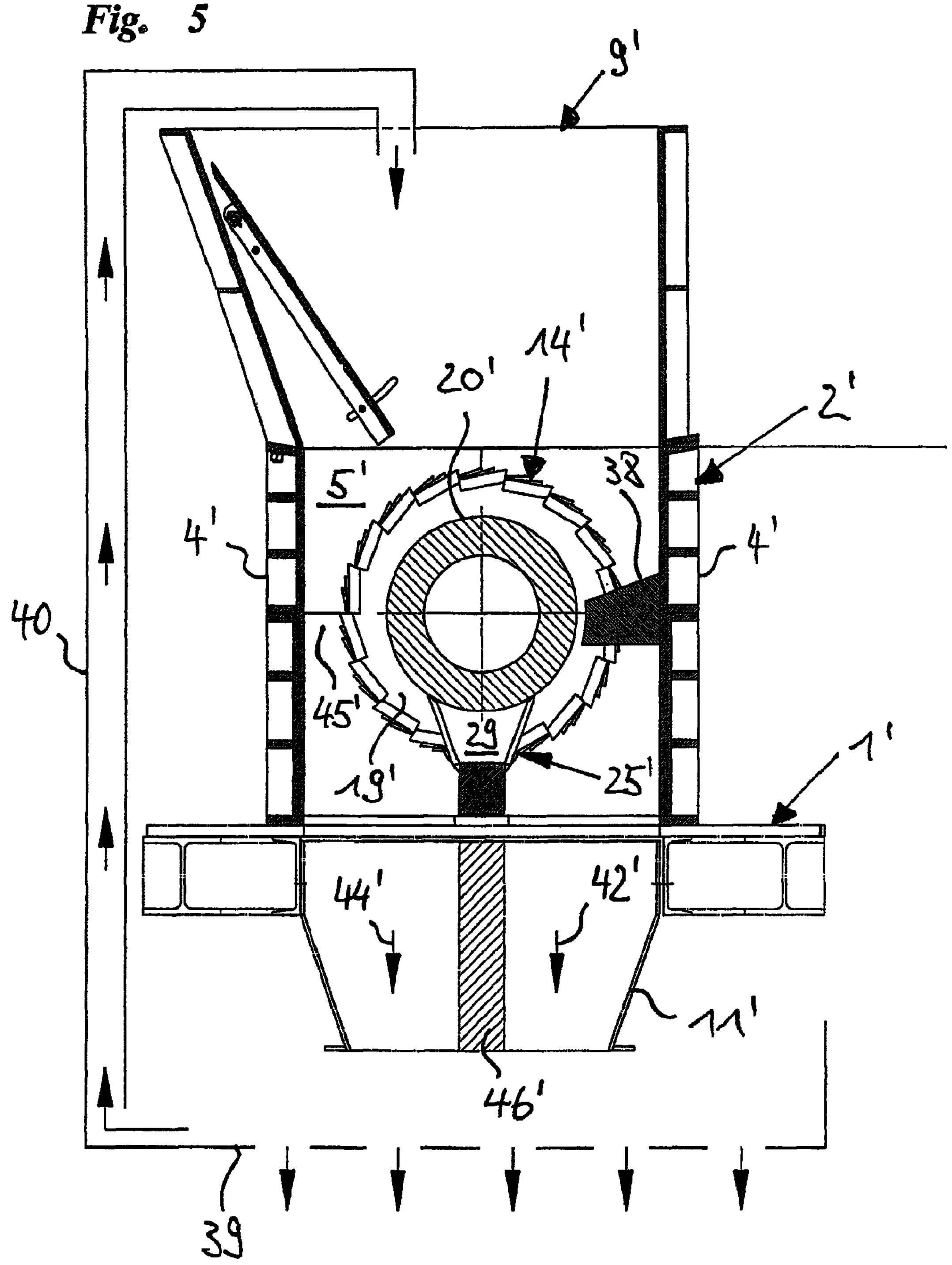
FIG. 5 shows a cross-sectional view of a further embodiment of the invention having only one rotor.

A further embodiment of the invention, having only one rotor 14', is shown in FIG. 5. Substructure 1', housing 2', material inlet 9' and material outlet 11' have principally the same structure as the embodiment described under FIGS. 1 through 4. However, since the second rotor of the cutting tool, with which the comminuting tools of rotor 14' may interact, does not exist, compared to the embodiment described above, a comb-like stator tool 38 whose teeth engage with the spaces between rotary disks 19' is situated on the inside of transverse wall 4'. The comminution work is therefore performed by rotary disks 19' and stator tools 38.

Scraping unit 25' corresponds to the one described above under FIGS. 1 through 4, so that reference is hereby made to the discussion thereof. Once again, material outlet 11' is divided with the aid of a partition wall 46', which prevents insufficiently comminuted feedstock 44' or foreign substances from mixing with stock flow 42 in reversing mode.

FIG. 5 shows peripheral function components, which are illustrated only schematically and which may be used in a manner that corresponds to the embodiment according to FIGS. 1 through 4. The function components essentially include a sieve 39, which ensures that only sufficiently comminuted feedstock is supplied to the further production processes. Feedstock that has not yet been sufficiently comminuted is returned to material inlet 9' via a material recovery system 40 and subjected to further comminution.

During operation of a device according to the invention, large pieces of cuttable feedstock, such as old tires, are supplied to comminution chamber 5, 5' via material inlet 9, 9'. With the aid of chute 10, the feedstock is supplied to the cutting tool in a targeted manner. Rotating comminuting tools 21, 21' grip the feedstock, draw it in the wake of their rotation and comminute it using their active edges. The comminuted feedstock is then removed from the device via material outlet 11, 11'. The material flow is clarified by arrows 41, 42 and 42'.

Depending on the type of feedstock, pieces of material may become stuck or wedged in the spaces between rotary disks 19, 19'. In the case of compound materials having steel inserts, such as old tires, the steel winds around distance plates 20, 20' between rotary disks 19, 19'.

To remove these accumulations of material, scraping units 25, 25' are provided which engage with the material accumulations by the edges of their scraping elements 29 adjacent to the shaft or distance plates 20, 20' and lift the material accumulations radially to the outside. If necessary, the side edges of scraping elements 29 may perform additional comminution work in interaction with comminuting tools 21, 21' of rotary disks 19, 19'. Since scraping units 25, 25' are located immediately downstream from rotors 14, 14' and 16 in the direction of throughflow of comminution chamber 5, 5', i.e. in the dead zone thereof, the sufficiently comminuted feedstock may reach material outlet 11, 11' unhindered. If feedstock which is unsuitable due to its size and/or hardness reaches the intake area of rotors 14, 16 or 14', an overload safety mechanism is activated. In this case, rotors 14, 14' and 16 are reversed, i.e. they are operated in the reverse direction of rotation. The interfering stock is removed from the device from below via free space 45 between transverse walls 4 and rotors 14 and 16. Due to its symmetrical design, scraping unit 25, 25' continues to operate and removes the interfering feedstock from rotor 14, 16 and 14'.

In the event that this type of automatic fault correction system is unsuccessful, the cutting tool is freely accessible on both sides for maintenance and repair work via swing-out transverse walls 4, 4' after removing their locking mechanism.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for comminuting scrappable feedstock by cutting or shear-cutting, the device comprising:
- a housing;
- at least one rotor provided within the housing;
- a plurality of rotary disks arranged on the rotor and arranged in axial distance from one another thereby forming spaces between one another, the rotary disks being fitted on a circumferential side with comminuting tools that interact with additional comminuting tools in order to perform comminution work; and
- stationary scraping elements extending into the spaces in a radial direction, the stationary scraping elements being arranged in a dead zone of at least one rotor with respect to a direction of material flow.

2. The device according to claim 1, further comprising a stationary support beam that is arranged parallel to an axis of the at least one rotor and on which the scraping elements are arranged.

3. The device according to claim 1, wherein the scraping elements each have an approximately trapezoidal contour, a side of the scraping element forming a base of the trapezoid being assigned to the rotor axis thereby maintaining a radial gap and having a concave curvature, a shorter side of the scraping elements that is opposite the base is connected to the support beam.

4. The device according to claim 3, wherein the width of the radial gap is at most one millimeter.

5. The device according to claim 3, wherein the curvature of the side forming the base is substantially the same or larger than the curvature of the radially opposite circumference of the longitudinal section of the rotor.

6. The device according to claim 1, wherein the scraping elements with their active side adjoin the at least one rotor at an angle $\alpha$>140 degrees.

7. The device according to claim 1, wherein the scraping elements have a monolithic design.

8. The device according to claim 1, wherein the scraping elements are each formed by a disk-shaped base member whose opposite edges in the direction of rotation form a bearing surface for scraping tools.

9. The device according to claim 8, wherein the scraping tools are wider in the axial direction than the base member.

10. The device according to claim 8, wherein the scraping tools and base member have a uniform width in the axial direction.

11. The device according to claim 1, wherein the scraping elements are mounted on a support beam to form a precise fit, using a centering device.

12. The device according to claim 1, wherein a clearance for conveying feedstock in a reversing mode is provided between the at least one rotor and at least one axially parallel housing wall.

13. The device according to claim 12, wherein the axially parallel housing wall is configured to be swiveled around a vertical axis in its entirety or in parts in order to open the housing.

14. The device according to claim 1, wherein a partition wall adjoins the scraping unit in a direction of feedstock throughflow.

15. The device according to claim 1, wherein a sieve, which includes a material recovery system for feeding the sieve residue back to the material inlet, is provided downstream from the rotors.

16. The device according to claim 1, wherein the additional comminuting tools are formed by stationary stator tools or by a second rotor.

17. A device for comminuting scrappable feedstock by cutting or shear-cutting, the device comprising:
- a housing having a material inlet;
- at least one rotor having a diameter provided within the housing;
- a plurality of rotary disks arranged on the rotor and arranged in axial distance from one another thereby forming spaces between one another,
- comminuting tools mounted on a circumferential side of the rotary disks; and
- stationary scraping elements extending into the spaces in a radial direction, the stationary scraping elements each having a width less than the diameter of the at least one rotor and being arranged on a side of the at least one rotor opposite from the material inlet.

18. The device according to claim 17, wherein the stationary scraping elements are located entirely beneath the at least one rotor with respect to a direction of material flow.

* * * * *